March 6, 1951  R. J. HARKENRIDER  2,544,155
APPARATUS FOR FEEDING MATERIAL
AT A PREDETERMINED RATE Filed March 27, 1945  8 Sheets-Sheet 1

INVENTOR.
ROBERT J. HARKENRIDER
BY
Joseph A. Ryan
ATTORNEY

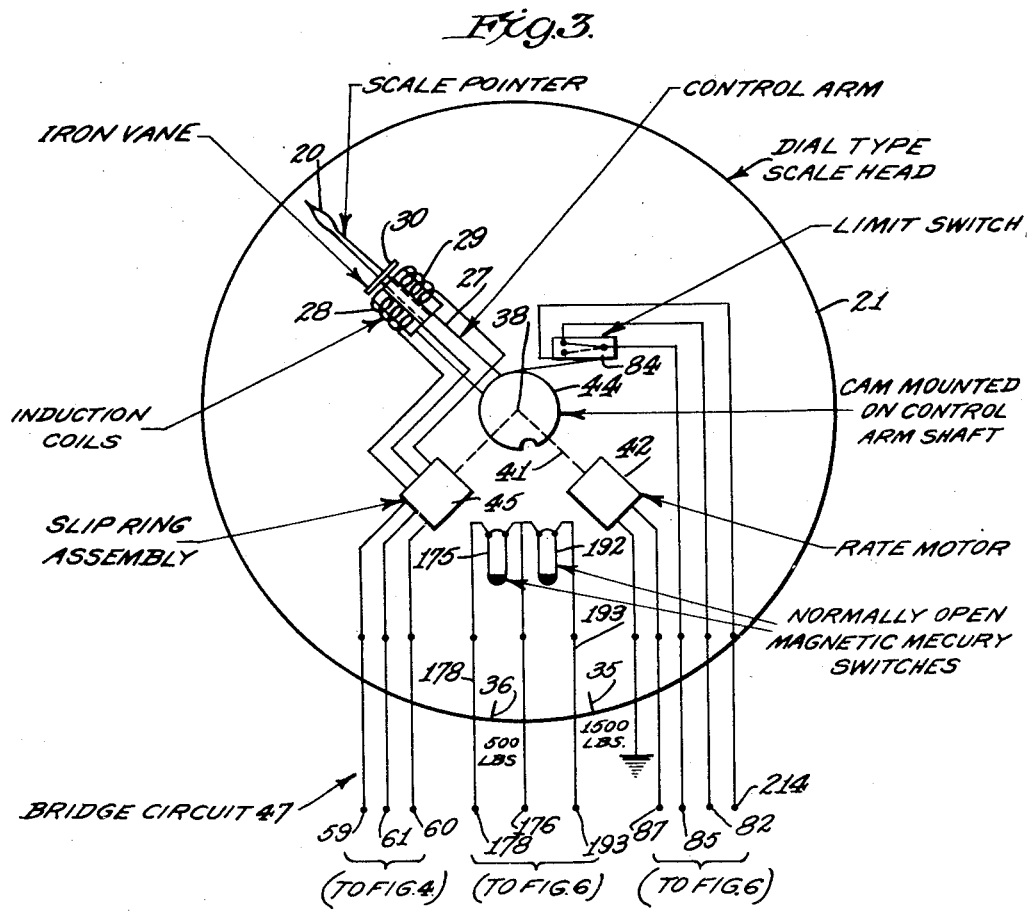
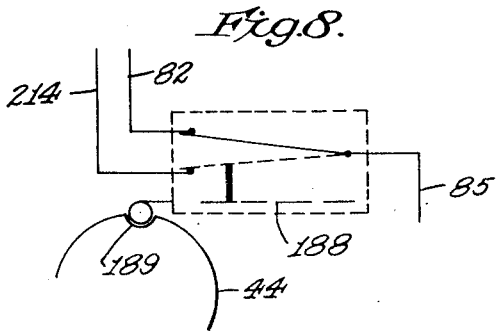

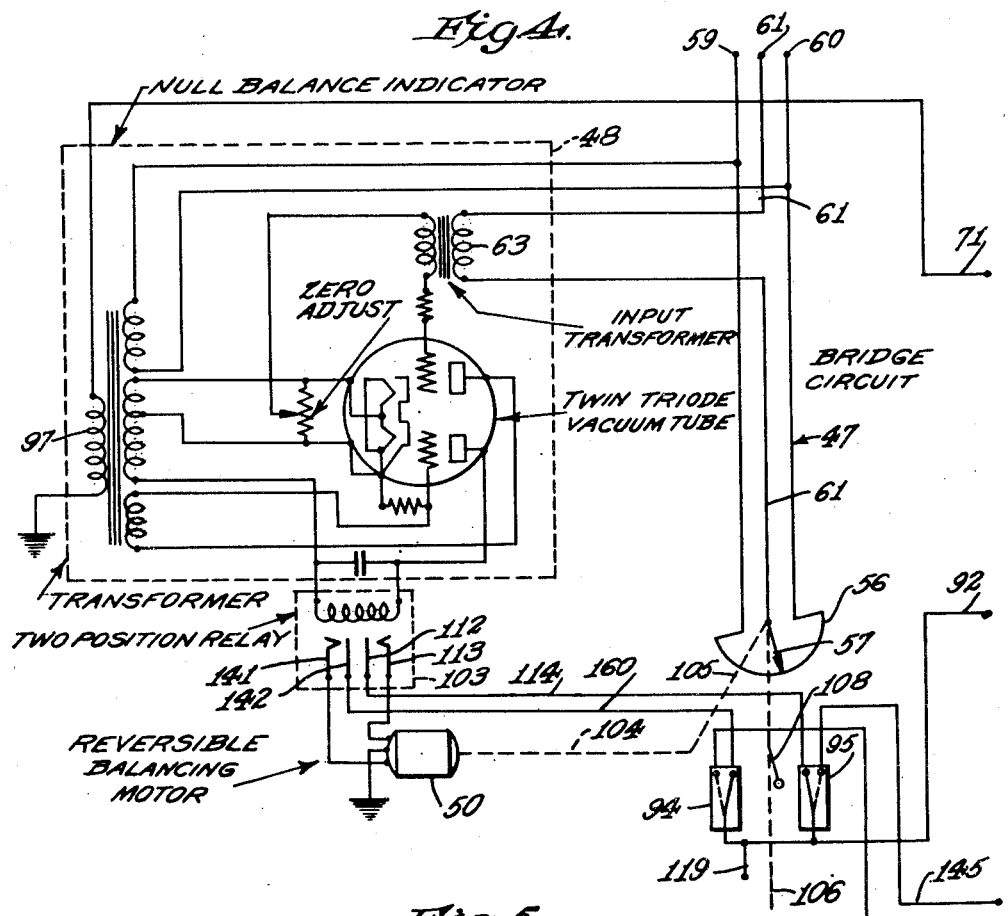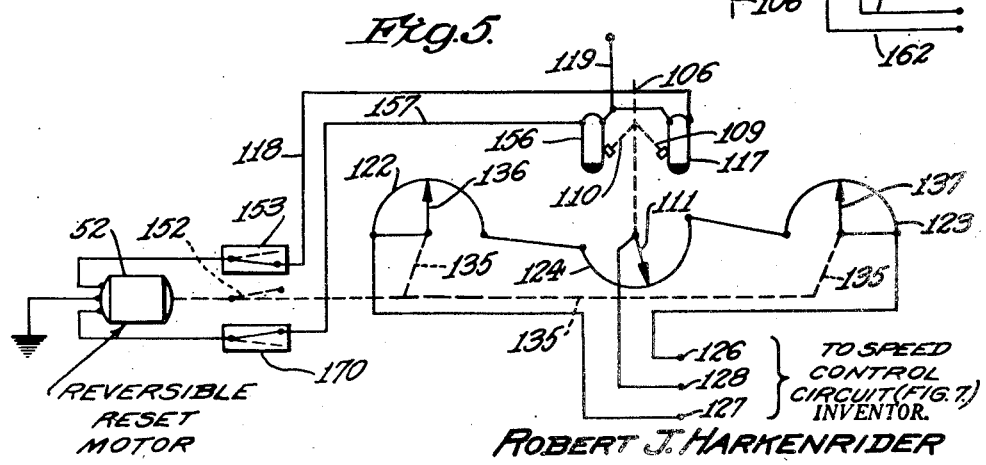

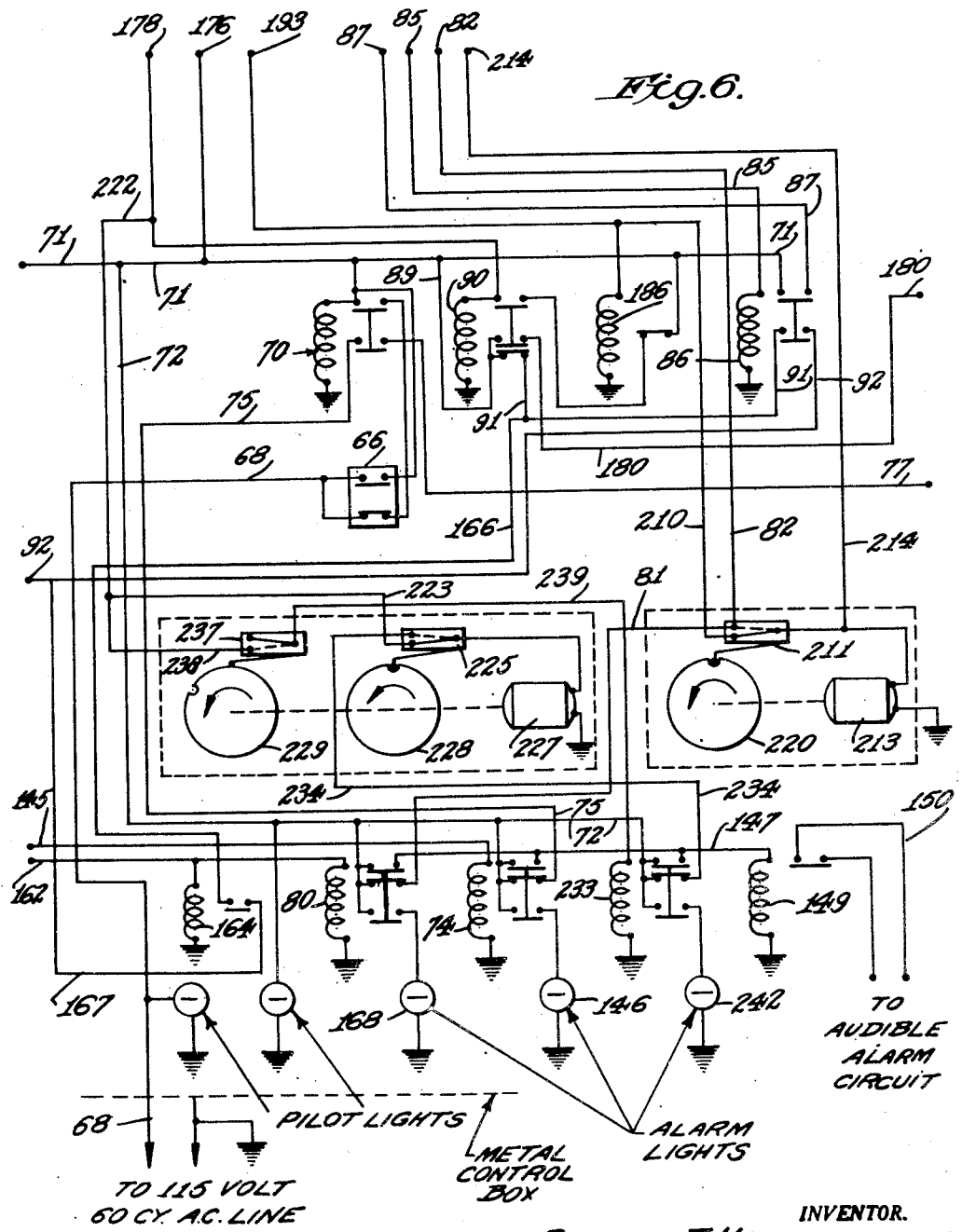

March 6, 1951        R. J. HARKENRIDER        2,544,155
APPARATUS FOR FEEDING MATERIAL
AT A PREDETERMINED RATE
Filed March 27, 1945                           8 Sheets-Sheet 5
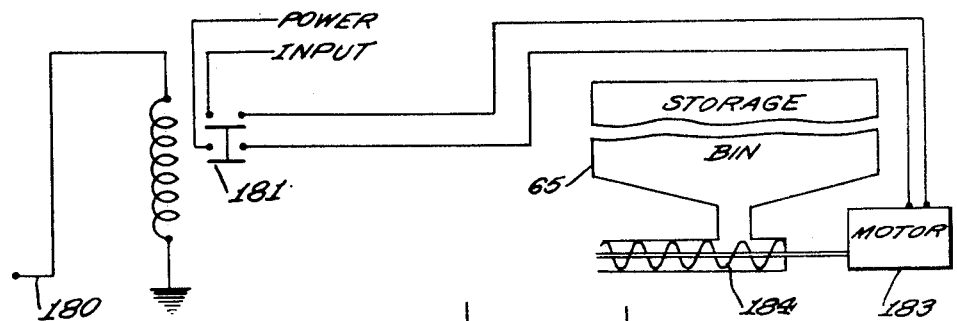
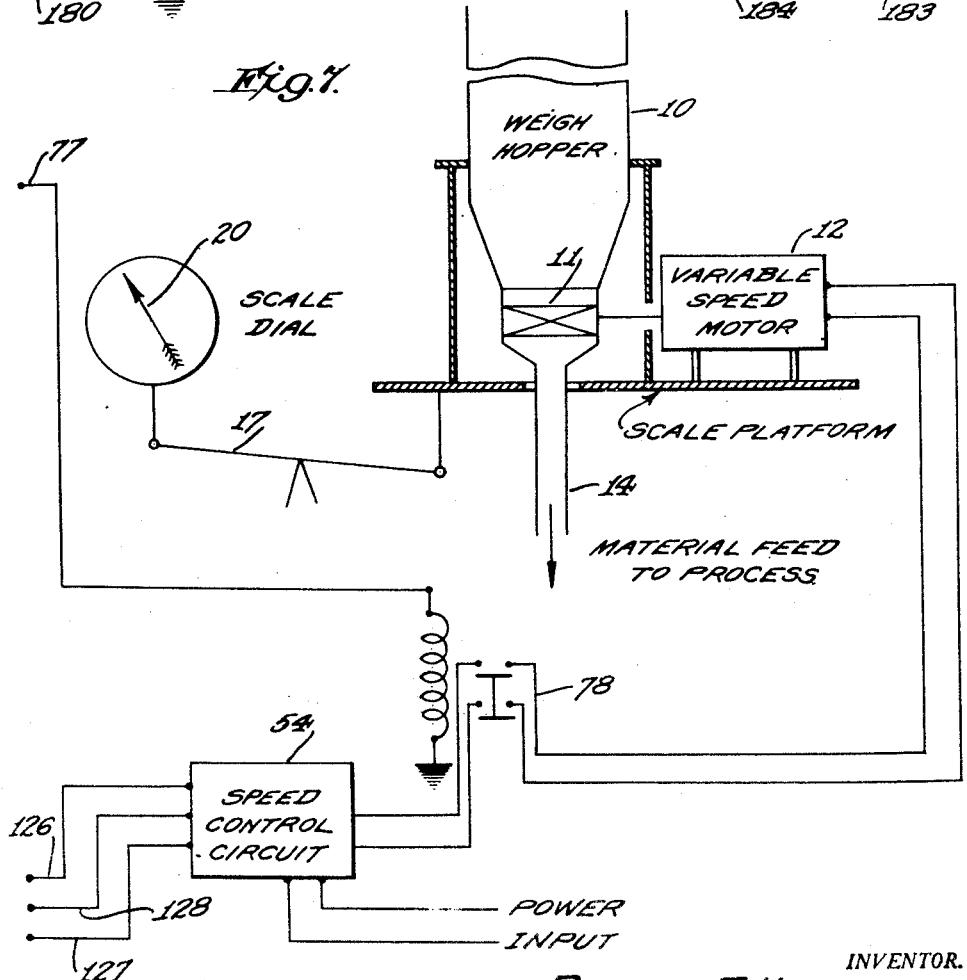
Fig. 7.
INVENTOR.
ROBERT J. HARKENRIDER
BY
Joseph A. Ryan
ATTORNEY

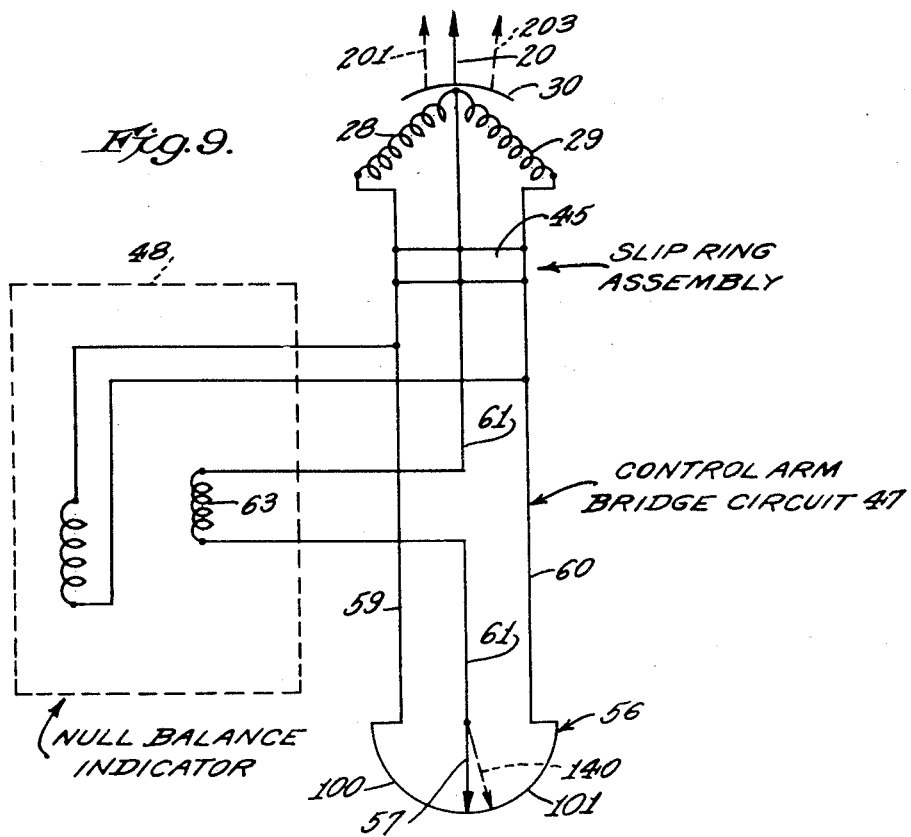
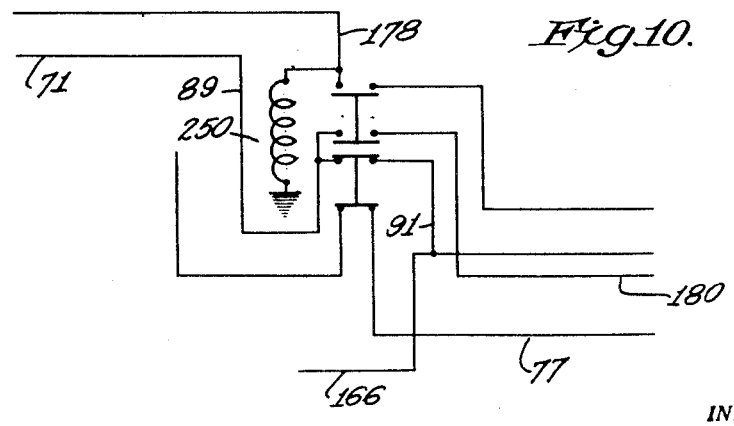

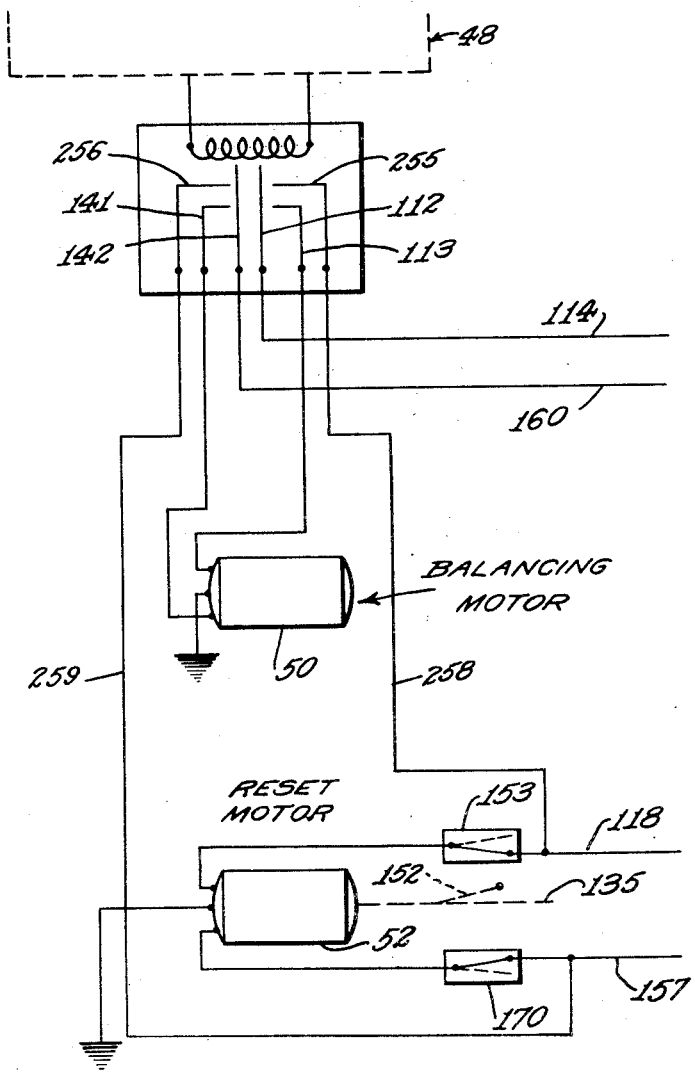

March 6, 1951 R. J. HARKENRIDER 2,544,155
APPARATUS FOR FEEDING MATERIAL
AT A PREDETERMINED RATE
Filed March 27, 1945 8 Sheets-Sheet 8
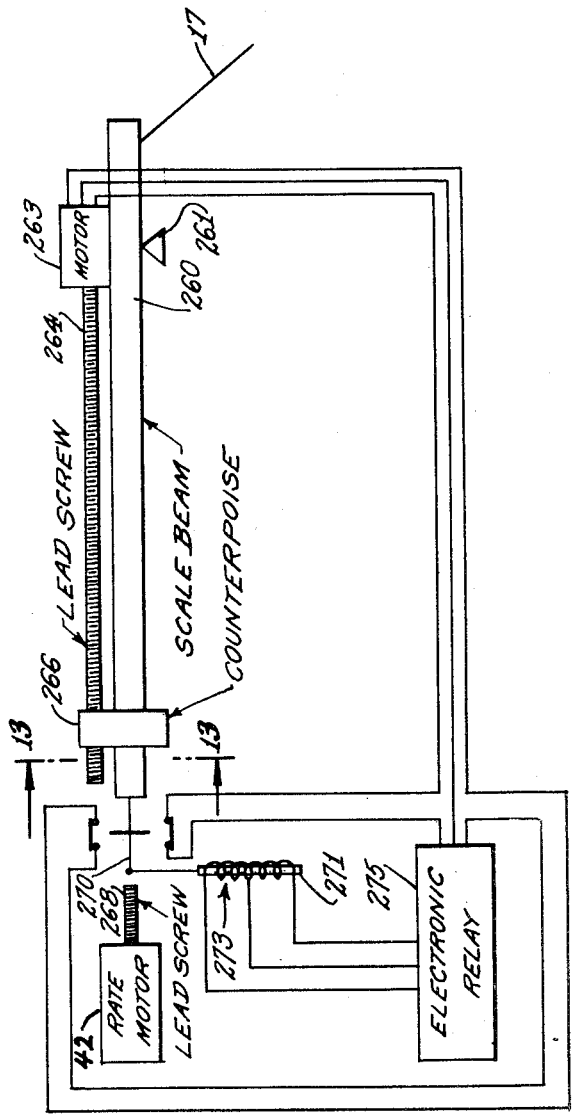
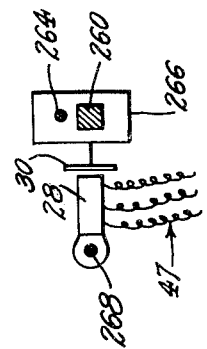
INVENTOR.
ROBERT J. HARKENRIDER
BY
Joseph A. Ryan
ATTORNEY Patented Mar. 6, 1951

2,544,155

UNITED STATES PATENT OFFICE 2,544,155

APPARATUS FOR FEEDING MATERIAL AT A PREDETERMINED RATE

Robert J. Harkenrider, Cleveland, Ohio, assignor to Allied Chemical & Dye Corporation, a corporation of New York Application March 27, 1945, Serial No. 585,159

11 Claims. (Cl. 222—58)

This invention relates to apparatus for feeding to a point of use a given amount, by weight or volume, of material at a predetermined rate.

General objects of the invention are to provide apparatus which insures delivery to a point of use of a predetermined amount of material within the selected time unit, minimizes fluctuations of the chosen rate of feed, and affords accuracy of material feed, both as to rate and total amount, over long periods of time.

Figure 1:
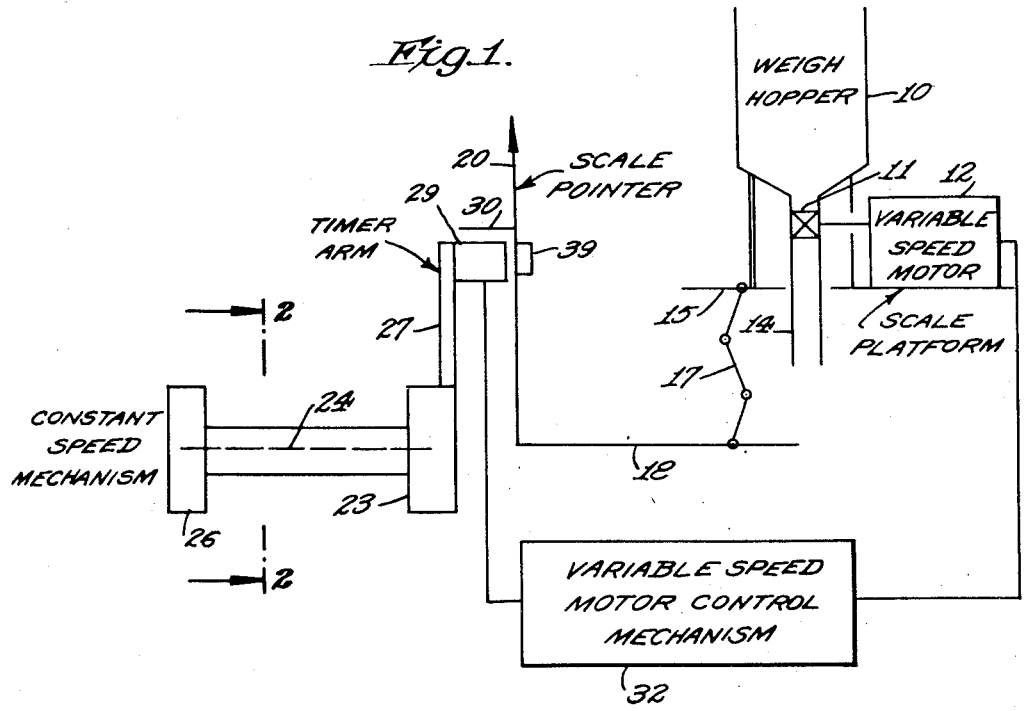
Figure 2:
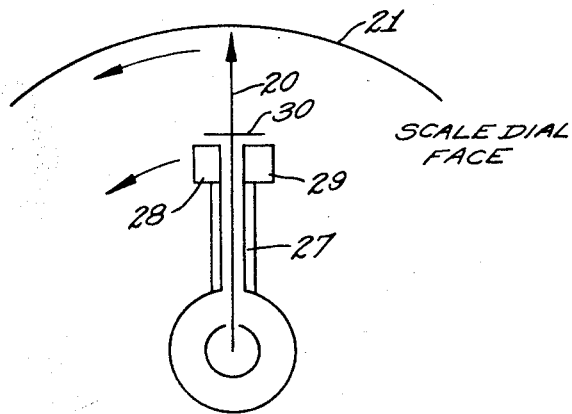

The invention, its objects and advantages will appear from the following description taken in connection with the accompanying drawings. Figs. 1 and 2 illustrate diagrammatically the principal elements of one embodiment of the invention, Fig. 2 being taken on the line 2—2 of Fig. 1; Fig. 3 shows diagrammatically in front elevation the circular dial of a weigh scale and its pointer, and an associated rate timer together with the wiring thereof; Fig. 4 is a wiring diagram and is an extension of Fig. 3; Fig. 5 shows a reset mechanism diagrammatically, Fig. 5 being an extension of Fig. 4; Fig. 6 is a wiring diagram and is an extension of Figs. 3 and 4; Fig. 7, an extension of Fig. 6, illustrates further wiring and includes diagrammatically other apparatus elements; Fig. 8 is a detail of a switch; Fig. 9 is an enlargement of certain portions of Figs. 3 and 4; Fig. 10 represents an alternative wiring of a part of Fig. 6; the wiring diagram of Fig. 11 is a modification of parts of Figs. 4 and 5; and Figs. 12 and 13 diagrammatically show a modified type of apparatus.

Generic principles of construction and operation of a preferred embodiment of the invention may be understood from Figs. 1 and 2. In Fig. 1, 10 is a weigh hopper or other receptacle having a discharge valve 11 which may be a known type of star feeder and which, when driven by a variable speed motor 12, operates to discharge material into conduit 14 from whence such material may be fed to the point of use. The invention primarily includes a valve such as 11 which is driven in the case of dry materials, or positioned in the case of liquids and slurries, to supply material to conduit 14 at a controllable predetermined rate which may be uniform, or variable as hereinafter discussed. For purpose of illustration, it may be assumed that it is desired to feed comminuted solid material from hopper 10 to a chemical process at a uniform rate of a given weight of material per unit of time.

The hopper, valve, motor, conduit and other accessories, constituting tare weight, are mounted on a scale platform 15. Thru linkage 17, indication of the net weight of material in hopper 10 is transmitted to shaft 18 having fixed to its outer end a scale pointer or weight indicator 20 adapted to move around the circumference of dial face 21 which denotes the number of pounds of material in the hopper. Numeral 23 indicates a head, rotatable about an axis 24 which is coaxial with axis 18, and connected to mechanism 26 which may be set to rotate the head about axis 24 at any predetermined, usually uniform rate of speed. Head 23 carries radial timer or control arm 27 having on its outer end a pair of induction coils 28 and 29. Mounted on the scale pointer is a small iron vane 30 adapted to lie in the magnetic field of coils 28 and 29. The head 23, mechanism 26, the arm, coils 28 and 29, and the immediately associated accessories constitute a rate timer.

Generally outlined, operation is as follows: Assume that when hopper 10 is full and material feed is about to begin, the pointer 20 is at the 12 o'clock position as in Fig. 2. Assume it is desired to discharge material from the hopper at a uniform rate of 100 lbs. an hour, and that when 100 lbs. have been discharged from the hopper, pointer 20 will have moved counterclockwise to the 9 o'clock position on the dial face. Head 23 is rotated by mechanism 26, and in this particular example such mechanism would be set to rotate head 23, control arm 27 and the induction coils 28 and 29 from the 12 o'clock position around to the 9 o'clock position in exactly one hour. Initially, motor 12 is adjusted as nearly as possible to drive valve 11 so as to discharge material at the rate of 100 lbs. per hour. It will be seen that if material is discharged from the hopper at the correct rate, the pointer 20 and the control arm 27 will maintain the identical relative position as shown in Fig. 2, but at the end of an hour the pointer and the control arm will have moved to the 9 o'clock position. Now assume that at some time during the hour, e. g. because of some change in the physical characteristics of the material being fed, such material is discharged from the hopper at too great a rate. Pointer 20 will gradually gain on the control arm 27, and the control arm and the pointer will get "out-of-step," i. e. no longer rotate in a common plane which passes thru the axis 18 and the axis 24. The improved apparatus of this invention is such that, in this situation, relative movement between the vane 30 and the induction coils 28 and 29 changes the inductance conditions of the coils. Such change is utilized and the effects thereof are transmitted to a variable speed motor control mechanism 32 which functions to slow down the rate of operation of motor 12 in proportion to the deviation of the pointer from the timer arm, eventually bring the pointer and the induction coils back into step, and maintain the rate of discharge of material by valve 11 proportional to the predetermined rate of movement of timer arm 27. The latter and its accessories may be considered as a timing device which, when rotated at a predetermined rate, effects such operation of valve 11 as to discharge from hopper 10 a given number of pounds of material per unit of time at such predetermined rate.

Fig. 3 shows in front elevation the dial face 21 having marked thereon a high point 35 representing say 1500 lbs., and a low point 36 indicating 500 lbs., the arrangement being such that, during discharge of material from hopper 10, pointer 20 moves counterclockwise about the axis 38 corresponding with axis 18 of Fig. 1. The pointer carries nothing but the iron vane 30 and a small permanent magnet 39, Fig. 1, and has no physical connection whatsoever with any of the rate timing mechanism now to be described. Further, the magnetic field of the induction coils is not strong enough to affect accurate movement of the scale pointer.

Practically, the control arm 27 and accessories are housed in a circular casing attached to the frame carrying the dial face. For purpose of illustration, however, the control arm and associated parts are shown diagrammatically in Fig. 3. The arm is rotated about axis 38 (corresponding with axis 24 of Fig. 1) by shaft 41 operated by a rate motor 42 which may be a constant speed synchronous motor provided with interchangeable gearing by means of which the rate of rotation of arm 27 may be changed to suit different operations. In place of such gearing, a variable frequency generator may be used to operate motor 42. A circular cam 44 and also a three-way slip-ring assembly 45 are mounted on shaft 41 and rotate therewith.

Major features of the mechanism for detecting any out-of-step relation between the scale pointer 20 and control arm 27 and correcting this out-of-step relation by changing the rate of discharge of material from hopper 10 by alteration of the rate of operation of hopper valve 11 include a three-wire bridge circuit shown partly in Fig. 3 and partly in Fig. 4 and indicated generally by 47; a null balance indicator 48 and a reversible balancing motor 50, Fig. 4; a reset mechanism of Fig. 5 including a reversible reset motor 52; and a speed control circuit 54 (Fig. 7) regulating variable speed motor 12, the speed control circuit 54 being actuated by the reset mechanism of Fig. 5.

The induction coils 28 and 29 carried by the control arm (Fig. 3) constitute two legs of a bridge circuit the opposite two legs of which are provided by the slidewire 56 (Fig. 4), opposite pairs of legs being connected by wires 59 and 60, and the bridge wire 61 and movable pointer 57. The bridge circuit and the null balance indicator are supplied from the same source of current, and transformer 63 is in the circuit of bridge wire 61. The null balance indicator illustrated in the drawing is a known electronic type suitable for operation on standard frequencies (e. g. 50–60 cycles) of alternating current such as commonly available. Instead of the particular balance shown, any similar electronic device or an A. C. galvanometer may be used. Most of the remaining mechanisms may be best described in connection with operation and use of the apparatus as a whole.

In the following example, it may be assumed that it is desired to feed solid comminuted material thru hopper discharge pipe 14 at a uniform rate of 1000 lbs. per hour. To provide in hopper 10 a substantial "heel" of material in order to facilitate continuous discharge of material from the hopper during subsequently described refilling of hopper 10, it may be assumed that the hopper 10 is designed to hold at least 1500 lbs. of material, thus affording a 500 lb. heel if desired. Hopper 10 is filled in any manner as from storage bin 65 (Fig. 7) with say 1400 lbs. of material. Valve 11 and motor 12 are out of operation, and the push button switch 66 (Fig. 6) is in the position shown in the drawing, i. e. open with no power entering the system. Scale pointer 20 is appreciably distanced from the high mark 35 (Fig. 3) and indicates 1400 lbs. on the dial. Timer arm 27 may be moved manually so that pointer 20 and the arm lie in a common plane passing thru axis 38 (Fig. 3), i. e. pointer 20 and arm 27 thus being in an "in-step" relation. Since it is desired to discharge material from hopper 10 at a uniform rate of 1000 lbs. per hour, it will be understood that the gearing between the rate motor 42 (Fig. 3) and shaft 41 is chosen or adjusted so that when driven by the rate motor the control arm will move at a uniform rate counterclockwise around the dial from the high point 35 to low point 36 in exactly one hour. Similarly, speed control circuit 54 and the associated reset mechanism of Fig. 5 are adjusted preliminarily to cause motor 12 to drive hopper valve 11 so as to discharge material as nearly as possible at a uniform rate of 1000 lbs. per hour. The entire system is then ready to start discharge of material from hopper 10. It will be understood that if one or more parts of the system are not manually adjusted at the start, shortly after beginning operation, the system will automatically regulate itself as will hereafter appear.

Current from an outside source enters the system thru lead 68. The normally open upper contacts of push button switch 66 (Fig. 6) are momentarily closed manually, and the coil of relay 70 is energized thus closing its two respective normally open circuits. After release of the upper contacts of button 66, the coil of relay 70 continues to be energized because current flows thru the normally closed lower contacts of the push button station and then thru the upper pair of contacts of relay 70 which are now closed. Whenever the coil of relay 70 is energized, current is fed to main line 71. Current passes thru line 72, thru the normally closed center contacts of relay 74, thru line 75, thru the now closed lower contacts of relay 70, and thence thru line 77 to the coil of switch 78 (Fig. 7) thus starting motor 12. Current from line 72 passes thru normally closed middle contacts of delayed-action relay 80, thru line 81, line 82, limit switch 84 (Fig. 3) and line 85 back to the coil of relay 86 (Fig. 6). When relay 86 is energized and the upper contacts closed, current flows from main line 71 thru line 87 to rate motor 42 (Fig. 3). On closure of the lower contacts of relay 86, current flows from main line 71 thru lead 89, the normally closed lower contacts of relay 90, thru line 91 and line 92 to limit switches 94 and 95, Fig. 4. Also, main line 71 of Fig. 6 supplies current to the transformer 97 of the null balance indicator 48 of Fig. 4.

All the foregoing circuits are energized instantly on closing of the upper contacts of push button 66, that is, the motor 12 operates discharge valve 11 and commences to feed material thru pipe 14, and rate motor 42 begins to move timer arm 27 counterclockwise away from the 1400 lb. mark on the scale dial, as also does pointer 20. Provided motor 12 operates at the correct speed and there is no appreciable change in e. g. the gravity flow of material to discharge valve 11, scale pointer 20 and the control arm 27 move "in-step" counterclockwise at such a uniform rate that at the end of nine-tenths of an hour, the control arm and the scale pointer still moving in-step will have reached the 500 lb. low mark 36 on the scale dial. Rate of discharge of material from scale hopper 10 will be directly proportional to the speed of control arm 27 providing the scale pointer 20 follows the movement of the control arm. During this correct operation, the iron vane 30 carried by pointer 20 remains centered with respect to the induction coils 28 and 29. No current flows thru bridge wire 61, and the control arm bridge circuit 47 remains balanced. When this condition exists, the null balance indicator 48 does not function, and the balancing motor 50 (Fig. 4) and the reversible reset motor 52 (Fig. 5) remain idle.

Assume that at some time during the progress of the scale pointer and the control arm around the dial, approximately at the 12 o'clock position of the pointer as represented in the enlarged diagram of Fig. 9, for some reason or other (for example, a change in the physical characteristics of the material in the hopper such as increased flowability) rate of discharge of material from the hopper increases sufficiently so that pointer 20 gradually gains on and leads the control arm a substantial amount but not enough to cause pointer vane 30 to get out of the effective range of the magnetic field of induction coils 28 and 29. Thus, the time interval of gain of pointer 20 may have been such that, at the end of the gain period, the pointer will have moved far enough ahead of the control arm to have arrived at position 201, Fig. 9. As soon as pointer 20 begins to gain on the timer arm and the pointer and arm begin to get out-of-step, vane 30 acts to increase the inductance in coil 28 and decrease the inductance in coil 29. The control arm bridge circuit 47 becomes unbalanced, and current flows thru bridge wire 61 with a given magnitude and direction. It will be seen from Fig. 9 that, when bridge circuit 47 is unbalanced by a scale pointer lead, in order to bring the bridge circuit back into balance, it would be necessary to increase resistance 100 and decrease resistance 101 of the slidewire 56 as by moving pointer 57 counterclockwise, that is, in the direction tending to bring the bridge circuit back into balance.

As soon as current passes thru bridge wire 61, the null balance indicator functions and operates to close either the right or left-hand pair of contacts of the two-position relay 103, Fig. 4, whichever pair, being dependent upon the direction of the current in bridge wire 61. Closure of either pair immediately throws balancing motor 50 into operation. In Figs. 4 and 5, the dotted lines 104, 105, and 106 may be considered as a continuous shaft driven by motor 50 and functioning to operate in unison slidewire pointer 57, limit switch actuator 108, actuating magnets 109 and 110 (Fig. 5), and pointer 111 of proportional slidewire 124. The null balance indicator and the two pairs of contacts of relay 103 are arranged so that, when the control arm bridge circuit gets out of balance by any out-of-step relation between pointer 20 and the control arm, balancing motor 50 rotates in such a direction as to move pointer 57 of slidewire 56 (Figs. 4 and 9) in a direction tending to correct the balance of control arm bridge circuit 47.

In the present example, it is assumed the scale pointer 20 is gaining on the control arm. In this instance, the relation of the null balance indicator and the relay 103 is chosen to be such that, when the scale pointer begins to lead the timing arm, simultaneously throwing the bridge circuit out of balance, contacts 112 and 113 of relay 103 close. Line 114 (Fig. 4) is energized from line 92 thru normally closed limit switch 95. At the moment of closure of contacts 112 and 113, motor 50 rotates in a direction to start to move slidewire pointers 57 and 111 counterclockwise (Figs. 4 and 5), switch actuator 108 toward limit switch 95, and switch actuator 109 toward normally open mercury contact switch 117. The adjustment of actuating magnet 109 is such that substantially immediately balancing motor 50 rotates in the direction indicated, switch 117 is closed and line 118 (Fig. 5) leading to the reversible reset motor 52 is energized, current for this purpose being brought into the system of Fig. 5 thru line 119 connected to line 92. Since scale pointer 20 is gaining on and has gotten ahead of the control arm, it will be understood that the ultimate correction of the rate of discharge of material from hopper 10 and the resultant bringing of the scale pointer and the timing arm to an in-step relation depend upon slowing down of the valve motor 12 of Fig. 7. This slowing down of motor 12 is effected by means of the reset slidewires 122 and 123 and proportional slidewire 124 of the reset mechanism of Fig. 5. These three slidewires constitute two legs of a bridge circuit comprising wires 126 and 127, and bridge wire 128, shown in Figs. 5 and 7. The remaining two legs of the reset circuit are included in the diagrammatically indicated speed control circuit 54 of Fig. 7. This speed control circuit may be of any suitable design such as any known grid control thyratron rectifier operating a D. C. motor from an A. C. source. It will be understood that current changes effected in bridge wire 128 by alterations of the positions of pointers 136, 137 and 111 cause the speed control circuit 54 to speed up or slow down hopper motor 12.

On its initial rotation, balancing motor 50, thru shaft 104—105—106, moves pointer 111 of slidewire 124 counterclockwise (proportionally with the deviation of scale pointer 20 from the control arm and likewise proportionally with the movement of pointer 57) thus reducing the resistance in the right-hand leg and increasing the resistance in the left-hand leg of the reset mechanism bridge circuit and unbalancing the same in a direction which initiates a slowing down of hopper motor 12. Since mercury switch 117 was thrown in substantially at the beginning of rotation of balancing motor 50, the reset motor 52 was started. The latter is connected thru shafting 135 to the pointers 136 and 137 of reset slidewires 122 and 123, and motor 52 initially rotates in such direction as to begin to move pointers 136 and 137 counterclockwise in unison, thus further accentuating the unbalance of the reset bridge circuit and causing further slowing down of motor 12. During this operation, pointers 111 and 137 act together to decrease resistance in the right leg of the reset bridge circuit, and pointers 111 and 136 act together to increase resistance in the left leg, that is on continued counterclockwise movement of these pointers, the three slidewires act additively to slow down motor 12, and this slowing down continues as long as any or all of pointers 111, 136 and 137 move counterclockwise.

The effective operation of the mechanisms thus far described—from the time the scale pointer begins to gain on the control arm, during the interval in which the scale pointer continues to gain on the control arm, and during the interval in which the scale pointer is being brought back into step with the control arm—is as follows: It will be understood that the scale pointer gains on the control arm because the rate of discharge of material from hopper 10 is increasing to above normal, thus correspondingly increasing the gain of the pointer over the control arm. Substantially at the moment the scale pointer begins to get ahead of the control arm, control arm bridge circuit 47 gets out of balance, the null balance indicator functions, motor 50 starts and rotates pointer 57 of slidewire 56 and pointer 111 of proportional reset slidewire 124 in unison counterclockwise by an amount proportional to the deviation of the scale pointer from the control arm. At substantially the same instant at which the pointer begins to gain on the control arm, reset motor 52 begins to rotate reset pointers 136 and 137 counterclockwise at a constant rate. As soon as pointer 111 began its counterclockwise movement, the reset mechanism of Fig. 5 and the speed control circuit 54 (Fig. 7) began to reduce the speed of hopper motor 12 and the rate of discharge of material from the hopper correspondingly. This amount of speed reduction of motor 12 at any given moment is directly proportional to the deviation between the scale pointer 20 and control arm 27, plus the additional decrease of speed effected by whatever constant-rate counterclockwise movement of reset pointers 136 and 137 takes place during such counterclockwise movement of pointer 111. As the scale pointer continues to gain (in spite of the initiation of slowing down the motor 12 and the rate of discharge of material from hopper 10) proportional pointer 111 continues to move counterclockwise proportionally with the scale pointer and, in conjunction with the simultaneously continued counterclockwise movement of pointers 136 and 137, further decreases the speed of motor 12. This speed decrease, in the manner just stated, continues as long as the scale pointer is gaining on the control arm, and until the rate of discharge of material from hopper 10 is reduced to normal, at which instant the scale pointer has arrived at its maximum deviation (e. g. position 201 of Fig. 9), and gain on the scale pointer over the control arm ceases.

If only the increased rate of discharge of material from the hopper were eliminated, thereby reducing on a smooth gradient the rate of material discharged from the hopper to normal, thereafter the scale pointer would cease to gain on the control arm but the pointer and control arm would continue to rotate counterclockwise in some fixed out-of-step relation. According to this invention, the rate of discharge of material from the hopper 10 is further altered so as to bring the scale pointer 20 back into step with the control arm, and also stop recession of the pointer at substantially its in-step position with the control arm, by the following action of the described mechanisms. At the moment the scale pointer reaches its maximum deviation and ceases to gain on the control arm, pointer 57 of slidewire 56 will have been rotated by the balancing motor to a position (e. g. position 140, Fig. 9) of maximum counterclockwise movement which is proportional to the maximum deviation of the scale pointer, and the control arm bridge circuit 47 becomes balanced, the null balance indicator ceases to function, contacts 112 and 113 open, motor 50 stops, and the counterclockwise movement of pointer 57 and of pointer 111 stops. However, switch 117 of the reset mechanism is not yet thrown out, and motor 52 continues to move reset pointers 136 and 137 counterclockwise, thus reducing the speed of motor 12 and reducing the rate of discharge of material from the hopper to some value below normal. As soon as the latter takes place, the scale pointer 20 begins to recede toward the control arm and to close the angular gap between the position 201 and the vertical, Fig. 9. Decrease of speed of hopper motor 12 to an amount still further below normal continues as long as reset motor 52 remains in operation.

At substantially the instant at which scale pointer 20 begins to reapproach the control arm, the control arm bridge circuit 47 is again unbalanced but in a direction opposite to that previously mentioned. The null balance indicator closes contacts 141 and 142 of the relay 103, motor 50 starts in reverse direction and begins to bring pointer 57 of the control arm bridge circuit and pointer 111 of the reset bridge circuit back clockwise toward their center positions. As the reset motor 52 is still working and moving reset pointers 136 and 137 in a direction tending to further decrease the speed of motor 12, the scale pointer continues to recede toward the control arm, and pointers 57 and 111 continue to approach their central positions. Since the movements of scale pointer 20 on the one hand and pointers 57 and 111 on the other are proportional, it will be seen that the scale pointer gets back in-step with the control arm, and pointers 57 and 111 return to their center positions at the same time. When the scale pointer 20 gets in step, and pointer 57 is returned simultaneously to its center position, the control arm bridge circuit becomes balanced, contacts 141 and 142 open, balancing motor 50 stops, and since shaft 104—105—106 has returned pointer 111 to its center position, actuator 109 will have permitted switch 117 to open, thus stopping reset motor 52 at substantially the moment the scale pointer and the control arm are back in-step.

It will be noted that while proportional pointer 111 was returning clockwise to its center position, reset pointers 136 and 137 were still moving counterclockwise in a direction tending to decrease the speed of hopper motor 12. However, clockwise movement of the pointer 111 tends to increase the speed of motor 12, and accordingly during its total clockwise movement pointer 111 counteracts the speed decreasing effects of pointers 136 and 137 sufficiently so that the clockwise movement of pointer 111 brings the speed of hopper motor 12 from the below normal (which was necessary to bring pointer 20 and the control arm back into step) up to normal, thus eliminating the below normal rate of discharge of material from hopper 10 and correspondingly minimizing the dropping back of the scale pointer behind the control arm once the in-step position of the pointer and the control arm has been reached. In short, in the example under discussion, i. e. of a scale pointer lead, any and all counterclockwise movement of proportional pointer 111 alters rate of discharge of material from hopper 10 from above normal (i. e. from an abnormal, specifically super-normal in this instance) to normal; any and all counterclockwise movement of reset pointers 136 and 137 alters rate of material discharge to below normal (i. e. to inversely abnormal, specifically sub-normal) to effect recession of the scale pointer to its in-step position; and any and all clockwise movement of pointer 111 alters rate of material discharge from below normal (i. e. from inversely abnormal, specifically sub-normal) back up to the normal for the situation at hand as the in-step position of the scale pointer is approached and reached. Since applicant's apparatus is adapted to correct for initial over-discharge or initial under-discharge of material from the hopper, "abnormal" is used in the comprehensive sense to include either over-discharge or under-discharge, in which situation "inversely abnormal" indicates a respective corresponding under-discharge or over-discharge.

In view of the foregoing described principles, matters of design such as rates of rotation of motors 50 and 52, the resistances in the various slidewires disclosed, and the relative rates of movement of pointers 136 and 137 on the one hand and 111 on the other may be chosen to accommodate the situation at hand, these features of design depending more or less upon the nature of the process to which the material is to be fed from the hopper outlet 14.

In the case of an operation in which for some reason or other, e. g. the material in hopper 10 becomes damp and less flowable, the rate of discharge of material from the hopper drops below normal, the scale pointer 20 will lag behind the control arm, e. g. to a position 203 (Fig. 9). Provided the vane 30 does not leave the effective range of the magnetic field of the induction coils, the return of the scale pointer from position 203 to its in-step position with the control arm is effected in the same way as already described in connection with a scale pointer lead, except that in the case of a pointer lag, all of the described mechanisms function in correspondingly opposite directions.

In practice, there may be circumstances in which pointer 20 tends to get far enough ahead of the control arm so that, if further gain were not prevented, the iron vane 30 would get out of effective range of the magnetic field of the induction coils. Such a condition might arise, for example, if material were suddenly discharged from hopper 10 at a substantially excessive rate. It will be understood that, in accordance with the particular design of vane 30 and the induction coils 28 and 29, the vane may be permitted to deviate from the coils as much as say an inch from the in-step position without getting out of the effective range of the coils. To provide for this situation, the adjustment of actuator 108 (Fig. 4) is such that on reaching maximum permissible pointer lead, switch 95 is thrown to the dotted position. Line 114 is deenergized and motor 50 immediately stops. Current then flows from switch 95 thru line 145 to the coil of relay 74. The upper and lower contacts of this relay close, alarm light 146 is thrown in, and line 147 and the coil of relay 149 are energized, the latter closing audible alarm circuit 150. When the coil of relay 74 is energized, the middle contacts are broken, line 75 goes dead, as also do line 77 and the coil of switch 78 (Fig. 7), thus stopping hopper motor 12. On cessation of discharge of material from the hopper, pointer 20 stops, the control arm continues to rotate counterclockwise at its set rate and eventually the control arm gets close enough to pointer 20 so that control arm bridge circuit 47 becomes unbalanced in a direction opposite to that existing when the scale pointer was gaining on the control arm, the null balance indicator functions, closes contacts 141 and 142 of relay 103, thus reversing motor 50 which thru shaft 104—105—106 throws actuator 108 out of contact with switch 95 and permits its switch leaf to return to the full-line position. Line 145 (Figs. 4 and 6) is then deenergized, the contacts of relay 74 drop to their normal position, and line 75 and line 77 are energized thus again starting hopper motor 12. On return of switch 95 to its full-line position, the pointer is thereafter returned from its leading to its in-step position with the control arm in the same manner as previously described.

It will be noted that when switch 95 (Fig. 4) is in its dotted line position and the alarm circuit is on and motor 12 is shut down, current is still being supplied to the reset mechanism of Fig. 5 thru line 119. Thus the reset mechanism continues to operate and to influence the speed control circuit 54 in a direction tending to slow down motor 12 even though this motor is stopped. In a condition of relatively long stoppage of hopper motor 12, reset motor 52 might continue to operate until the counterclockwise moving pointers 136 and 137 approach a horizontal position. In this situation, adjustment of actuator 152 is such as to throw out limit switch 153, thus stopping motor 52 and preventing damage to slidewires 122 and 123 and their pointers. It will be understood that pointers 136 and 137 may have moved so far counterclockwise as to have created a condition in speed control circuit 54 such that, after motor 12 is again thrown in, the motor operates at a speed excessively below normal. In this case, pointer 20 will subsequently return not only to the in-step position but to a position of lag behind the control arm because motor 12 is operating at an excessively low speed. As soon as pointer 20 reaches the in-step position, the contact between actuator 109 and switch 117 (Fig. 5) is broken, contact between actuator 110 and switch 156 is made, line 157 is energized, motor 52 reverses and allows limit switch 153 to return to its normal position. Thereafter the condition of scale pointer lag is corrected as previously described.

There may be other circumstances in which pointer 20 tends to get far enough behind the control arm so that, if further lag were not prevented, the iron vane 30 would get out of the effective range of the magnetic field of the induction coils. Such a condition might arise if hopper valve 11 became clogged. To provide for this situation, the adjustment of actuator 108 (Fig. 4) is such that on reaching maximum permissible pointer lag, switch 94 is thrown to the dotted line position on Fig. 4, line 160 is deenergized and motor 50 immediately stops. Current then flows from switch 94 and line 162 to the coil of relay 164 (Fig. 6) and the coil of delayed action relay 80. As soon as the contacts of relay 164 are closed, current flows from main line 71 thru lead 89, thru the lower contacts of relay 90, line 91, line 166, the closed contacts of relay 164, and to line 167, thus supplying a steady flow of current to line 92, line 119 (Figs. 4 and 5) and the reset mechanism. When the coil of relay 80 is energized, alarm light 168 and audible alarm circuit 150 are thrown in. The center contacts of relay 80 are broken, line 81 and line 82 of Figs. 6 and 3 are broken, line 85 goes dead, relay 86 (Fig. 6) is deenergized, the upper contacts of the latter are broken, and line 87 leading to the rate motor goes dead, thus stopping the control arm. When hopper valve 11 is put back in operation, and discharge of material from the hopper recommences, scale pointer 20 again begins to rotate counterclockwise, and eventually the pointer gets close enough to the control arm so that control arm bridge circuit 47 becomes unbalanced in a direction opposite to that existing when the scale pointer was falling behind the control arm, the null balance indicator functions, closes the right-hand contacts of relay 103, thus reversing motor 50 which thru shaft 104—105—106 throws actuator 108 out of contact with switch 94 and permits its switch leaf to return to the full-line position. Line 162 is then deenergized, the contacts of relays 164 and 80 fall in their normal position, lines 81, 82, 85 and the coil of relay 86 are energized, thus again starting rate motor 42. On return of switch 94 to its full-line position, the pointer is thereafter returned from its lagging to its in-step position with the control arm in the same manner as previously described.

It will be noted that when switch 94 is in its dotted line position and the alarm circuit is on and rate motor 42 is shut down, current is still being supplied to the reset mechanism thru line 119. Thus the reset mechanism continues to operate and to influence the speed of control circuit 54 in a direction tending to speed up hopper motor 12 even though this motor may be stopped because of the clogging of valve 11. In a condition of relatively long stoppage of discharge of material from the hopper, reset motor 52 might continue to operate until the clockwise moving slidewire pointers 136 and 137 approach a horizontal position. In this situation, adjustment of actuator 152 is such as to throw out limit switch 170 thus stopping motor 52. Pointers 136 and 137 may have moved so far clockwise as to have created a condition in speed control circuit 54 such that after valve 11 and motor 12 are again working, the latter operates at a speed excessively above normal. Scale pointer 20 is subsequently returned not only to its in-step position but to a position ahead of the control arm because motor 12 is operating at an excessively high speed. As soon as scale pointer 20 reaches the in-step position, the contact between actuator 110 and switch 156 (Fig. 5) is broken, contact between actuator 109 and switch 117 is made, line 118 is energized, motor 52 reverses and allows limit switch 170 to return to its normal position. Thereafter, the condition of scale pointer lead is corrected as previously described.

When the scale pointer 20 reaches the low point 36 on the dial, the normally open magnetic mercury switch 175 is closed by the action of the small permanent magnet 39 carried by the scale pointer. Current is then fed from main line 71 thru line 176 (Figs. 6 and 3) thru closed switch 175 and line 178 to the coil of relay 90, thus closing the center contacts of the latter. Current passes thru line 180 (Figs. 6 and 7) to the coil of switch 181, closing the latter and starting motor 183 which drives a conveyor 184 by means of which material is fed from the main storage bin 65 into weigh hopper 10. At the same time the lower contacts of relay 90 are broken, lines 91 and 92 go dead, and the balancing and reset motors remain idle during filling of hopper 10.

When filling of hopper 10 commences, the scale pointer begins to move rapidly clockwise toward the high point 35 on the dial. As soon as pointer 20 moves away from low point 36, the mercury switch 175 opens and line 178 goes dead. But the coil of relay 90 continues to receive current from main line 71 thru the normally closed contacts of relay 186 and the now closed upper contacts of relay 90 thus keeping the center contacts of relay 90 closed and effecting continued filling of hopper 10. Since the lower contacts of relay 90 are now open, line 91 is dead, and even though the lower contacts of relay 86 remain closed during an initial portion of the refilling cycle, line 92 is dead, and the balancing and reset motors remain cut out while the hopper is being filled.

During the early phase of the hopper filling period, rate motor 42 continues to run counterclockwise until the control arm 27 reaches high point 35 on the scale dial. At this time, the leaf 188 (Fig. 8) of limit switch 84 drops into notch 189 of cam 44, and switch 84 falls to its dotted line position. Lead 85 (Figs. 3 and 6) goes dead, relay 86 is deenergized, thus opening the upper and lower contacts of the latter, deenergizing line 87 and stopping the rate motor. Because the counterclockwise distance between the low and high points on the scale dial is considerably shorter than the clockwise direction thru which pointer 20 returns, and also because the minimum filling time is limited by design, the control arm 27, by its continued counterclockwise movement, always reaches the high point 35 before the pointer 20, i. e. before the hopper is filled.

When sufficient material is fed into hopper 10, the scale pointer hits the high point 35, and the small permanent magnet 39 carried by the pointer closes the normally open magnetic switch 192. At this instant, current flows from line 176 thru switch 192, thru line 193 (Figs. 3 and 6) to relay 186 causing the normally closed contacts thereof to open and break the current from main line 71 to the coil of relay 90, thus opening the middle contacts of relay 90 at which time line 180 goes dead, switch 181 (Fig. 7) opens, filling motor 183 is stopped, and filling of the weigh hopper ceases. At the same time, the lower contacts of relay 90 close and line 91 is energized. Simultaneously, as the scale pointer hits the high point and closes magnetic switch 192, current flows from line 193 thru line 210, thru the normally closed contacts of limit switch 211 to the recycling timer motor 213, and also thru line 214, thru the dotted line position of limit switch 188, thru line 85 to the coil of relay 86 thus closing its upper contacts and starting the rate motor, and closing its lower contacts to energize the lines leading to the balancing and reset motors.

During refilling of the weigh hopper and the clockwise return of the scale pointer 20 from the low to the high point on the dial, hopper motor 12 has been operating and discharging material at the set rate, such material being withdrawn from the previously referred to heel maintained in the hopper. At the instant pointer 20 hits the high point on the dial and closes high point switch 192 the following conditions exist: the control arm is at the high point and stopped; the scale pointer and the control arm are again in-step; filling of the weigh hopper ceases; recycling timer motor 213 starts; rate motor 42 starts; and the balancing and reset motor circuits are energized. The scale pointer and the control arm immediately begin to move in-step counterclockwise away from the high point to repeat a succeeding traverse of the scale dial.

As soon as the scale pointer moves away from the high point, switch 192 opens, lines 193 and 210 (Fig. 6) go dead. However, since motor 213 was started on the previous closure of high point switch 192, on starting of motor 213, limit switch 211 was thrown to the dotted line position and then current is supplied to motor 213 and line 214 from the main line 71 thru the center contacts of relay 80 and line 81. The purpose of motor 213 is to supply current thru line 214, the dotted position of limit switch 84, line 85, relay 86, and thru the now closed upper contacts of relay 86 and line 87 to rate motor 42 in the interval during which leaf 188 of limit switch 84 is in or rising out of notch 189 on cam 44. Motor 213 continues to run until the actuator of limit switch 211 again falls into the notch on timer motor cam 220 at which time limit switch 211 returns to its full-line position and motor 213 stops because lines 193 and 210 are dead immediately after the scale pointer leaves the high point. The rate of rotation of timer motor 213 and the size of cam 220 are chosen so as to supply current (thru line 214) to the rate motor until the leaf 188 is well out of notch 189 and limit switch 84 has returned to its normal full-line position after which time the rate motor receives current thru lines 81 and 82 as previously described.

As above mentioned, there is enough of a heel left in the scale hopper when the scale pointer 20 reaches low point 36 to supply the discharge valve with material while the hopper is being refilled. In the embodiment being described, refilling of the weigh hopper is effected in about 5 minutes. However, should the weigh hopper not be filled within a definite time limit a second recycling timer operates as follows: When the low point switch 175 is closed by the scale pointer and filling of the weigh hopper 10 is started, the upper contacts of relay 90 close and current is supplied from main line 71 thru the closed contacts of relay 186, the upper contacts of relay 90, part of line 178, line 222 and line 223 to limit switch 225. Current passes thru the full-line position of switch 225 and starts recycling timer motor 227 which operates cams 228 and 229 thru a common shaft. Once motor 227 has started to run, switch 225 is actuated by cam 228 and thrown to the dotted line position in which condition motor 227 received current thru the middle contacts of relay 233 and line 234. If the hopper is not filled by the time the notch on cam 229 permits limit switch 237 to fall to its dotted position, current is fed thru line 238 and line 239 to the coil of relay 233. When the latter is energized, alarm light 242 and the audible alarm circuit 150 are thrown in, the center contacts of relay 233 are broken, line 234 goes dead and timer motor 227 stops. Consequently, the alarm circuit remains energized until the coil of relay 90 is deenergized which condition exists when the weigh hopper is filled. If the hopper is filled by the time the notch on cam 229 closes limit switch 237, the coil of relay 90 will have been deenergized, lines 238 and 239 are deenergized and the coil of relay 233 remains dead as does the alarm circuit, and by current from line 234 timer motor 227 will operate until limit switch 225 again falls into the notch on cam 228 and returns to its full-line position at which time motor 227 stops. The foregoing cycle is repeated each time the hopper is filled. The length of a hopper filling cycle is represented by the counterclockwise distance on cam 229 between the notch and the point of contact of the leaf of limit switch 237, this distance being so chosen as to afford the desired time interval for filling the hopper. In the event of a failure of the filling apparatus, the alarm circuit will be energized before the hopper runs empty.

In the foregoing embodiment, material is discharged from the weigh hopper all during the refilling operation. In some instances, it may be desirable to stop discharge of material from the weigh hopper during refilling. This may be accomplished by means of the wiring arrangement illustrated in Fig. 10. A four-way relay 250 is substituted for the three-way relay 90 of Fig. 6. The lower contacts of relay 250 are placed in the line 77 which controls the starting and stopping of the hopper motor 12. It will be recalled that the relay 90 is energized only during filling of the weigh hopper. The same holds true with respect to the coil of relay 250 of Fig. 10. It will be seen that when the coil of the latter is energized, the lower contacts are broken, no current flows thru line 77 to the coil of hopper motor control switch 78 (Fig. 7) and motor 12 stops. When the weigh hopper is filled, the coil of relay 250 is deenergized, and current again flows thru line 77 to the hopper motor control switch.

In Fig. 11, a modification of parts of Figs. 4 and 5, the relay 103 has an additional set of contacts 255 and 256 connected respectively thru lines 258 and 259 with lines 118 and 157, the latter corresponding with lines 118 and 157 of Fig. 5 and being connected to a reset motor 52 which, in the apparatus of Fig. 11, is a known type of reversible motor which may be stalled without damage. In the operation of this modification, when the scale pointer 20 is ahead of and gaining on the timer arm, contacts 112 and 113 are closed, and balancing motor 50 initiates the operation of mechanisms of Figs. 4 and 5 to start to slow down the gain of scale pointer 20 over the timer arm 27, in the same manner as already described. During this same interval, contacts 112 and 255 (Fig. 11) are closed, and line 258 is energized. Since switch 117 (Fig. 5) has been closed and current is already flowing to the reset motor 52 thru line 118, the presence of current in line 258 does not influence the operation of motor 52.

As previously described, substantially at the moment the gain of scale pointer 20 over the control arm ceases, contacts 112 and 113 break, and the counterclockwise movement of proportional pointer 111 stops. The reset pointers 136 and 137 continue to rotate counterclockwise and further decrease the speed of hopper motor 12, since reset motor 52 is receiving current from line 118 even though contacts 112 and 255 are broken. Shortly after gain of the scale pointer ceases, the scale pointer begins to recede from its position of maximum deviation from the control arm, at which time contacts 141 and 142 close, and return of pointer 111 to its center position commences. On closure of contacts 141 and 142, contacts 142 and 256 likewise close, and line 259 leading to the opposite side of the reset motor is energized. Since the currents now flowing to motor 52 thru lines 118 and 259 are equal, motor 52 stalls and stops. This action prevents any further counterclockwise movement of reset pointers 136 and 137 and any further slowing down of hopper motor 12 which would be effected had not such movement of pointers 136 and 137 been stopped.

In the operation of Figs. 4 and 5, reset slidewires 136 and 137 rotate in a counterclockwise direction continuously while the scale pointer is returning to its in-step position. In the modification of Fig. 11, substantially at the instant pointer 111 begins to return clockwise to its center position, reset motor 52 stalls, and the reset pointers 136 and 137 stop. Thereafter, since pointer 111 continues to return to its center position thereby speeding up hopper motor 12 from its below normal toward its normal speed, it will be seen that the rate of recession of the scale pointer towards its in-step position slows down. Should this rate of slowing down be enough to reduce the rate of recession to zero before pointer 20 reaches the in-step position, the control arm bridge circuit becomes balanced, contacts 141 and 142 and contacts 142 and 256 open, balancing motor 50 stops, and line 259 goes dead. Since current is still being supplied to reset motor 52 by line 118, motor 52 again moves slidewires 136 and 137 in a counterclockwise direction until the scale pointer begins further recession toward the in-step position. Thus, in some circumstances the scale pointer 20 may be brought back into step by a plurality of starts and stops of the reset mechanism. Hence utilization of this modification promotes relatively slow and smooth return of the scale pointer to its in-step position and minimizes the tendency of the scale pointer to be carried back of the timer arm to a position of lag.

With respect to operation of the embodiment of Fig. 11, in situations in which the scale pointer gets ahead of the control arm to a position of maximum permissible deviation without getting out of the effective range of the magnetic field of the induction coils, switch 95 (Fig. 4) is thrown to the dotted line position, and line 114 leading to contact 112 goes dead. Hence, there is no current in line 258 (Fig. 11). It will be recalled in this situation the hopper motor 12 is stopped, and the control arm 27 continues to rotate counterclockwise at the set rate until the control arm gets close enough to pointer 20 so that the control arm bridge becomes unbalanced, and motor 50 reverses. As soon as this condition occurs, switch 95 drops back to its full-line position, contacts 141 and 142 are closed by the null balance indicator, and in Fig. 11, contact 256 also closes energizing line 259. Reset motor 52 immediately stalls inasmuch as at this time line 118 is energized. After the stalling of motor 52, scale pointer 20 is returned to its in-step position as previously described in connection with Fig. 11.

It will be noted that, in the operation of Figs. 4 and 5, in an unusual but possible circumstance of a substantial lead of the scale pointer and a relatively long stoppage of hopper motor 12, limit switch 153 in line 118 is thrown out to prevent damage to slidewires 122 and 123. In the modification of Fig. 11, the same action takes place. However, just as the scale pointer ceases to gain on the control arm and begins to recede from its position of maximum deviation to its in-step position, contacts 141, 142 and 256 (Fig. 11) close, line 259 is energized, reset motor 52 begins to reverse, withdraws switch actuator 152 from limit switch 153 and permits the latter to close. Since an equal current now flows to motor 52 from line 118, motor 52 stalls. Thereafter, scale pointer 20 is returned to its in-step position as already described relative to Figs. 4 and 5.

All the foregoing embodiments of the invention have been described on the assumption that timer arm 27 is regulated so as to move at a uniform rate from the high point to the low point on the scale dial. It will be understood that the timer as a whole may be adjusted, as by interposition of suitable mechanism between rate motor 42 and shaft 41, so that timer arm 27 moves from the high point on the scale dial to the low point at say a constantly accelerating, constantly decelerating or other desired rate. In these instances, the scale pointer 20 follows the timer just as when timer arm 27 rotates at a constant rate. All embodiments of the invention are such that over a given time interval, e. g. hour to hour or day to day basis, rate of discharge of material from the hopper and total weight discharged are directly proportional to the setting of the timer. Also, for example in the case of a scale pointer lead, during the time interval within which the scale pointer is brought back to the in-step position, the amount of material discharged from the hopper is decreased by an amount equal to the excessive amount of material discharged while the scale pointer was gaining on the control arm, that is, during a given material discharge correcting period, the degree of correction made is directly proportional to the degree of correction needed. Further, correction is made without appreciable fluctuations above and below normal at the end of the correcting period.

In utilizing the invention to control rate of discharge of liquids and slurries from a hopper, tank or other receptacle, the bridge circuit of the reset mechanism of Fig. 5 may be incorporated as a part of a null balance indicator (not shown) functioning to control the starting and stopping of a reversible motor (not shown) which, thru suitable mechanical linkage, rotates the stem of say a gate valve to position the same so as to regulate the rate of discharge of liquid or slurry. Such valve may be considered as a proportioning valve and corresponds with valve 11 of the drawing. Operation is the same as already described except, instead of actually driving a mechanical feed valve such as 11, the mechanisms of the invention serve to alter the position of a gate valve to proportionally decrease or increase the flow of liquid or slurry from the receptable. In the appended claims expressions such as "valve positioning means," "valve positioner" and terms of like import unless otherwise qualified are intended to include (1) in the case of handling a liquid or slurry, the positioning of a valve to regulate rate of discharge of material, and (2) in the case of handling a solid, the actual driving of a valve such as 11 to effect discharge of material from a hopper.

When handling liquids or slurries, the discharge pipe 14 of the hopper may be conveniently provided with an on-and-off valve (not shown) positioned just below the proportioning gate valve. The on-and-off valve may be solenoid operated, e. g. closed tight by a spring and opened wide when the solenoid is energized. Power to the solenoid may be supplied thru a switch actuated by current in line 77 of Fig. 7.

Figs. 12 and 13 diagrammatically illustrate application of the invention to a beam type scale. In Fig. 12, 260 indicates a scale beam, fulcrumed at 261 and connected thru link 17 with the scale platform. Motor 263 suitably mounted on the beam may be a reversible, variable speed motor (e. g. a series D. C. motor) which, thru a lead screw 264 is capable of moving counterpoise 266 the length of the beam. Attached to one side of the counterpoise is an iron vane 30 associated with the induction coils 28 and 29 which are arranged to be moved parallel with the scale beam by means of a lead screw 268 driven by the rate motor 42. At its extreme end, beam 260 carries an arm 270 and a depending vertically movable core 271 constituting a part of an induction coil 273, the circuit of the latter being connected with a relay 275 such as an electronic differential relay with an automatic reset.

In the operation of this modification, adjustment of motor 263 is such as to drive the counterpoise in such direction and speed that the scale beam tends to remain horizontal, i. e. balanced with the weight of material in the hopper 10. Assume that it is desired to discharge from hopper 10 a thousand pounds of material per hour at a uniform rate, and that while so doing counterpoise 266 is moved from its outermost to its innermost limits on the beam. Rate motor 42 is adjusted to move induction coils 28 and 29 at a uniform rate from a position corresponding with the outermost position of the counterpoise to a position corresponding to the innermost position of the counterpoise in exactly one hour. It will be understood that as material is discharged from the hopper 10, the outer end of beam 260 tends to drop but that if material is discharged from the hopper correctly at the sought-for rate, beam 266 remains horizontal, and the rate timer and the counterpoise move in-step over the length of the scale beam. In an instance in which rate of discharge of material from the hopper is too great, the hopper lightens and beam 260 tends to drop. To keep the beam ba'anced, it is necessary to move the counterpoise nearer fulcrum 261. As the outer end of the beam drops, movement of coil 271 changes conditions in coil 273 and relay 275 so as to cause motor 263 to move the counterpoise inwardly at a greater rate thereby bringing the scale beam back to balance. By so moving the counterpoise, the latter and attached vane 30 will have gained on and gotten out of step with the induction coils 28 and 29 which then act thru bridge circuit 47, in the manner already described, to slow down the rate of discharge of material from hopper 10. When this latter rate falls be'ow normal, scale beam 260 tends to rise, and by so doing actuates the electronic relay to slow down the inward rate of travel of the counterpoise, thus bringing the latter and the uniformly moving induction coils back into step. It will be understood that in this modification, counterpoise 266 corresponds with dial scale pointer 20, and that motor 263, induction coil 273, electronic relay 275 and the immediately associated accessories represent mechanisms by means of which counterpoise 266 is moved along the scale beam in accordance with the actual amount of material in the hopper.

The principles of the invention may be employed also to regulate the volumetric discharge of liquid from a tank or other suitable receptacle. For example, a tank adapted to contain a large quantity of liquid e. g. at least 1500 gallons, may be provided with a float which, by means of suitable mechanical linkage to a pointer such as pointer 20, indicates in gallons the amount of liquid in the tank. The tank may be provided at its outlet with a valve such as a gate valve. In the circumstances assumed, the pointer indicates on the dial, such as dial 21, the actual gallonage in the tank, and the rate timer functions in conjunction with the pointer, in the manner previously described, to control the setting of the outlet valve of the tank to obtain the desired uniform rate of discharge of liquid.

In place of the induction coils shown on timer arm 27, any standard type of bridge circuit may be used, as for example a resistance capacity bridge. In this instance, a metal vane on the scale pointer is the common plate of the two bridge condensers, and two separate metal plates on the control arm complete the condenser portion of the bridge.

I claim:

1. Apparatus for continuously discharging a predetermined amount of material from a hopper at a predetermined rate comprising a hopper, a discharge outlet for said hopper, a valve for said outlet adaptable to regulate the actual rate of discharge of material from said hopper, an indicator operable in accordance with the amount of material in said hopper and movable over a graduated course to constantly denote the actual amount of material in said hopper, a rate timer, means for moving said timer at a rate proportional to said desired predetermined rate of discharge of material from said hopper, said indicator and said timer being constructed and arranged so as to move constantly in-step when said valve functions to effect discharge of material from the hopper at said predetermined rate, means actuated by any out-of-step relation of said indicator and said timer for regulating said valve to alter the actual rate of discharge of material from said hopper sufficiently to restore said indicator and said timer to said in-step relation, means actuated by the indicator at the end of its material discharge travel over said course to feed material to said hopper, and means actuated by the indicator on its return over said course to stop said feeding means.

2. In apparatus of the character described including a hopper and means for discharging a predetermined amount of material from said hopper at a predetermined rate; the said discharging means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

3. In apparatus of the character described including a hopper and means for discharging a predetermined amount of material from said hopper at a predetermined rate; the said discharging means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate; said last two mentioned means cooperating during said correcting period to discharge material in amount to substantially compensate for the amount of material discharged during said period by said abnormal rate.

4. In apparatus of the character described including a hopper, a discharge outlet for said hopper, a valve for said outlet, and means to position said valve to effect discharge of a predetermined amount of material from said hopper at a predetermined rate; the said valve positioning means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

5. In apparatus of the character described including a hopper, a discharge outlet for said hopper, a valve for said outlet, and means to position said valve to effect discharge of a predetermined amount of material from said hopper at a predetermined rate; the said valve positioning means comprising means acting during an initial phase of a correcting period and on abnormal rate of discharge of material from said hopper to alter abnormal rate of discharge sufficiently to effect substantially normal rate of discharge, means acting thereafter during a subsequent phase of said period to effect inversely abnormal rate of discharge of material from said hopper, and means acting during said subsequent phase and during inversely abnormal rate of discharge to alter inversely abnormal rate of discharge sufficiently to restore discharge of material from said hopper to said predetermined rate.

6. In apparatus of the character described including a hopper, a discharge outlet for said hopper, a valve for said outlet, and electrically actuated means to position said valve to effect discharge of a predetermined amount of material from said hopper at a predetermined rate; the said valve positioning means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

7. Apparatus of the character described comprising a hopper and means for discharging a predetermined amount of material from said hopper at a predetermined rate, said discharge means comprising: an indicator movable in accordance with the amount of material in said hopper to denote the amount of material in said hopper, a rate timer, means for moving said timer at a rate proportional to said desired predetermined rate of discharge of material, said indicator and said timer being constructed and arranged so as to move in-step when material is discharged at said predetermined rate and in out-of-step relation on improper discharge of material from said hopper, means for returning said indicator and said timer from an out-of-step relation to the in-step relation and for re-establishing said predetermined rate, said returning means including; means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

8. Apparatus of the character described comprising a hopper and means for discharging a predetermined amount of material from said hopper at a predetermined rate, said discharge means comprising: an indicator movable in accordance with the amount of material in said hopper to denote the amount of material in said hopper and a rate timer electrically associated with but physically detached from said indicator, means for moving said timer at a rate proportional to said desired predetermined rate of discharge of material, said indicator and said timer being constructed and arranged so as to move in-step when material is discharged at said predetermined rate and in out-of-step relation on improper discharge of material from said hopper, means for returning said indicator and said timer from an out-of-step relation to the in-step relation and for re-establishing said predetermined rate, said returning means including; means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

9. Apparatus for discharging a predetermined amount of material from a hopper at a predetermined rate comprising a hopper, a discharge outlet for said hopper, a valve for said outlet adaptable to regulate the rate of discharge of mateial from said hopper, a movable indicator operable in accordance with the amount of material in said hopper to denote the amount of material in said hopper, a rate timer, means for moving said timer at a rate proportional to said predetermined rate, said indicator and said timer being constructed and arranged so as to move in-step when said valve effects discharge of material at said predetermined rate and in out-of-step relation when said valve effects discharge of material at improper rate, valve positioning means for returning said indicator and said timer from an out-of-step relation to the in-step relation and for re-establishing said predetermined rate, the said valve positioning means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

10. Apparatus for discharging a predetermined amount of material from a hopper at a predetermined rate comprising a hopper, a discharge outlet for said hopper, a valve for said outlet adaptable to regulate the rate of discharge of material from said hopper, a movable indicator operable in accordance with the amount of material in said hopper to denote the amount of material in said hopper, a rate timer associated with but physically detached from said indicator, means for moving said timer at a rate proportional to said predetermined rate, said indicator and said timer being constructed and arranged so as to move in-step when said valve effects discharge of material at said predetermined rate and in out-of-step relation when said valve effects discharge of material at improper rate, electrically actuated valve positioning means including a bridge circuit and a proportional reset mechanism for returning said indicator and said timer from an out-of-step relation to the in-step relation and for re-establishing said predetermined rate, the said valve positioning means comprising means acting during a correcting period and subsequent to abnormal rate of discharge of material from said hopper to effect inversely abnormal rate of discharge of material from said hopper, and means acting during said correcting period and during inversely abnormal rate of discharge to alter inversely abnormal rate of discharge sufficiently to restore discharge of material from said hopper to said predetermined rate.

11. Apparatus for discharging a predetermined amount of material from a hopper at a predetermined rate comprising a hopper, a discharge outlet for said hopper, a valve for said outlet adaptable to regulate the rate of discharge of material from said hopper, a movable indicator operable in accordance with the amount of material in said hopper to denote the amount of material in said hopper, a rate timer, means for moving said timer at a rate proportional to said predetermined rate, said indicator and said timer being constructed and arranged so as to move in-step when said valve effects discharge of material from the hopper at said predetermined rate and in out-of-step relation when said valve effects discharge of material at improper rate, valve positioning means for returning said indicator and said timer from an out-of-step relation to the in-step relation and for re-establishing said predetermined rate, the said valve positioning means comprising means actuated by initiation of out-of-step deviation between indicator and timer and at the beginning of a correcting period to return abnormal rate of discharge to normal rate and to stop further deviation, means actuated during said period and subsequent to maximum deviation to effect inversely abnormal rate of discharge of material from said hopper, and means actuated during said period and during inversely abnormal rate of discharge to alter inversely abnormal rate of discharge sufficiently to restore discharge of material from said hopper to said predetermined rate.

ROBERT J. HARKENRIDER.

REFERENCES CITED

The following references are of record in the file of this patent:

UNITED STATES PATENTS

| Number | Name | Date |
|---|---|---|
| 764,705 | Bousser | July 12, 1904 |
| 1,059,005 | Schaffer | Apr. 15, 1913 |
| 1,777,670 | Hausman | Oct. 7, 1930 |
| 1,890,160 | Montgomery | Dec. 6, 1932 |
| 1,983,093 | Montgomery | Dec. 4, 1934 |
| 2,046,005 | Sprecker | June 30, 1936 |
| 2,322,374 | Lowe | June 22, 1943 |
| 2,373,788 | Sivertsen | Apr. 17, 1945 |
| 2,381,505 | Lindholm | Aug. 7, 1945 |
| 2,408,221 | Michel | Sept. 24, 1946 |